(12) United States Patent
Yang et al.

(10) Patent No.: US 9,661,243 B2
(45) Date of Patent: May 23, 2017

(54) CMOS IMAGE SENSOR WITH COLUMN-WISE SELECTIVE CHARGE-DOMAIN BINNING

(71) Applicant: Forza Silicon Corporation, Pasadena, CA (US)

(72) Inventors: Guang Yang, Annandale, NJ (US); Ramy Tantawy, Monrovia, CA (US)

(73) Assignee: FORZA SILICON CORPORATION, Pasadena, CA (US)

( * ) Notice: Subject to any disclaimer, the term of this patent is extended or adjusted under 35 U.S.C. 154(b) by 293 days.

(21) Appl. No.: 14/216,518

(22) Filed: Mar. 17, 2014

(65) Prior Publication Data
US 2014/0263964 A1 Sep. 18, 2014

Related U.S. Application Data

(60) Provisional application No. 61/801,658, filed on Mar. 15, 2013.

(51) Int. Cl.
*H04N 5/347* (2011.01)
*H04N 5/374* (2011.01)
*H04N 5/3745* (2011.01)

(52) U.S. Cl.
CPC ........... *H04N 5/347* (2013.01); *H04N 5/3741* (2013.01); *H04N 5/37457* (2013.01)

(58) Field of Classification Search
CPC .. H04N 5/37457; H04N 5/347; H04N 5/3741; H04N 5/335; H04N 5/341;

(Continued)

(56) References Cited

U.S. PATENT DOCUMENTS

| | | | | |
|---|---|---|---|---|
| 4,809,075 A | * | 2/1989 | Akimoto | H01L 27/14818 257/E27.154 |
| 8,605,177 B2 | * | 12/2013 | Rossi | H04N 5/3454 348/221.1 |
| 2008/0291309 A1 | * | 11/2008 | Gruev | H04N 5/3658 348/308 |

* cited by examiner

*Primary Examiner* — Que T Le
*Assistant Examiner* — Jennifer Bennett
(74) *Attorney, Agent, or Firm* — David V. Rossi; Haug Partners LLP

(57) ABSTRACT

An imaging device and method for operating the imaging device. Some embodiments comprise a pixel array configured as rows and columns of binning pixel units, each binning pixel unit including a plurality of photosensors that generate respective charge signals in response to incident light. Each binning pixel unit is configured to selectively bin the charge from at least two of the photosensors. The pixel array may be readout in a binning-pixel-unit row by binning-pixel-unit row basis. During readout of each binning pixel unit row, each binning pixel unit in the row is operable to selectively bin at least two of the charge signals therein based on a respective one of control signals provided to each of the binning pixel units in the row. In reading out a binning pixel unit row for a given image frame, a first binning pixel unit may perform in-pixel charge domain binning while a second binning pixel unit in the row may not bin the charge from the different photosensors therein. The respective control signals may be provided as a reset control signal coupled to the binning pixel units via respective vertical reset control lines, each of which is coupled to all of the binning pixel units in a respective column of binning pixel units, each reset control signal being operable to cause potential level resetting of a charge storage region in the binning pixel cell.

7 Claims, 9 Drawing Sheets

(58) Field of Classification Search
CPC ................. H04N 3/155; H04N 3/1562; H01L 27/14643; H01L 27/14603; H01L 27/14601
USPC ....... 250/208.1, 214 R, 214.1; 257/257, 258, 257/290, 291, 292, 443; 348/294, 302, 348/308
See application file for complete search history.

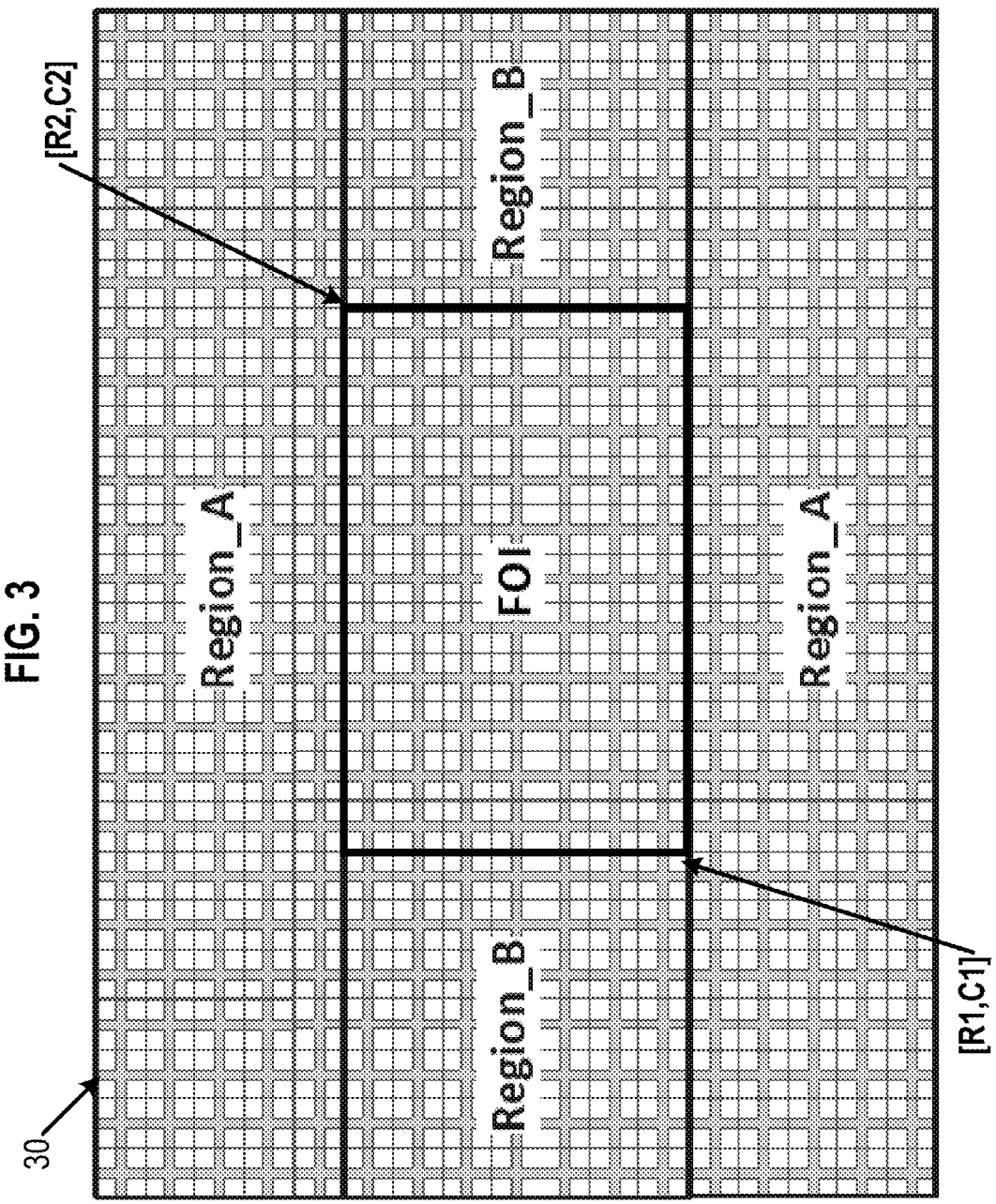

CMOS IMAGE SENSOR WITH COLUMN-WISE SELECTIVE CHARGE-DOMAIN BINNING

RELATED APPLICATIONS

This application claims the benefit of U.S. Provisional Application No. 61/801,658, filed Mar. 15, 2013, which is hereby incorporated herein by reference in its entirety.

BACKGROUND

Embodiments of the present invention relate generally to image sensors, image sensor architecture, and pixel circuits; more particularly, some embodiments relate to systems and methods for charge-domain binning in an image sensor.

In an image sensor, pixel binning (i.e., combining signals of two or more pixels of an image sensor) in the charge-domain is known to provide for increasing the signal-to-noise ratio as well as for increasing the frame rate for a given pixel array readout bandwidth or, correspondingly, decreasing the pixel array readout bandwidth requirements for a given frame rate. In a CMOS image sensor, charge-domain binning may be implemented in a non-shared pixel architecture, in which each pixel includes dedicated readout circuitry (though pixels may selectively share, for example, a charge storage regions when binning charge), or in a shared pixel architecture, in which each group of two or more pixels may share at least some pixel circuitry, such as one or more of the following: a reset transistor, a floating diffusion, a source-follower transistor, and a row select transistor.

Some shared as well as non-shared pixel architectures configured for charge-domain binning may provide for selectively reading out one or more rows of pixels in either a charge-domain binning mode (e.g., each pixel in the row is binned with one or more pixels in the same row and/or one or more pixel in at least one other row) or a non-binning mode (i.e., individual pixels are readout separately). In addition, some architectures provide for selecting among two or more binning modes, such as 1×2, 2×1, 2×2 binning (using the typical convention of m×n binning meaning the combination of m pixels in the horizontal (row) direction and n pixels in the vertical (column) direction), same color binning (e.g., combining pixels of the same color over a neighborhood of pixels corresponding to the color filter array (CFA) pattern), etc.

Such selective charge-domain binning may be based on timing control and/or on in-pixel switchable reconfiguration of the pixel circuitry. For instance, in a shared pixel architecture having pixels that are hardwired to share a common floating diffusion, the pixels may be read out separately by time-multiplexing each pixel's charge transfer to the common floating diffusion while resetting the floating diffusion in advance of transferring each pixel's charge to the floating diffusion. To bin these shared pixels, their respective charge may be transferred to the common floating diffusion either successively, without resetting the floating diffusion between charge transfers, or simultaneously.

Selective binning based on switchable reconfiguration may employ pixels with respective isolated floating diffusion regions that may be selectively conductively connected using switches (e.g., transistors). For binning a given pair of pixels, their respective floating diffusions may be conductively coupled via a switch, and their charge may be transferred to the common floating diffusion either successively, without resetting the floating diffusion between charge transfers, or simultaneously. These pixels may be readout individually by deactivating the transistor (driving it "off," to an open state) to isolate the respective floating diffusions in advance of charge being transferred thereto. While it is possible through timing control, similar to that described above for pixels with hardwired floating diffusions, to readout the pixels individually even when their floating diffusions are electrically connected via the switch, typically that is not done because the selective electrical connection of the floating diffusions is usually employed to scale the effective conversion gain inversely with the number of pixels being binned. As such, when a pixel is to be readout individually, the associated conversion gain for reading out the pixel is increased by opening the associated switch(es) to isolate the pixel's floating diffusion from the floating diffusion(s) selectively coupled thereto via the switch(es).

Such CMOS image sensor architectures that provide for pixel binning are configured such that for each row of a given frame, all of the pixels that are readout from the row are necessarily readout in the same mode, namely, either in a non-binning mode or in a particular binning mode. For instance, in CMOS image sensors having only one binning readout mode (e.g., 2×2), for a given frame, all the pixels readout from a given row are readout in either the non-binning mode or the binning mode. In addition, in configurations permitting more than one binning mode, all of the pixels for a row that is readout in a binning mode are readout in the same binning mode (e.g., all pixels are readout in a 1×2, 2×1, or 2×2 binning mode, exclusively). In other words, CMOS image sensors are configured such that different pixels readout from the same row for a frame cannot be readout in different modes.

BRIEF DESCRIPTION OF THE DRAWINGS

Aspects, features, and advantages of some embodiments of the invention, both as to structure and operation, will be understood and will become more readily apparent in view of the following description of non-limiting and non-exclusive embodiments in conjunction with the accompanying drawings, in which like reference numerals designate the same or similar parts throughout the various figures, and wherein:

FIG. 3 schematically depicts a pixel array comprising an array of shared-pixel binning units, similar to those described with reference to FIGS. 1A and 1B, in connection with an illustrative example, in accordance with some embodiments;

DETAILED DESCRIPTION

Figure 1A:
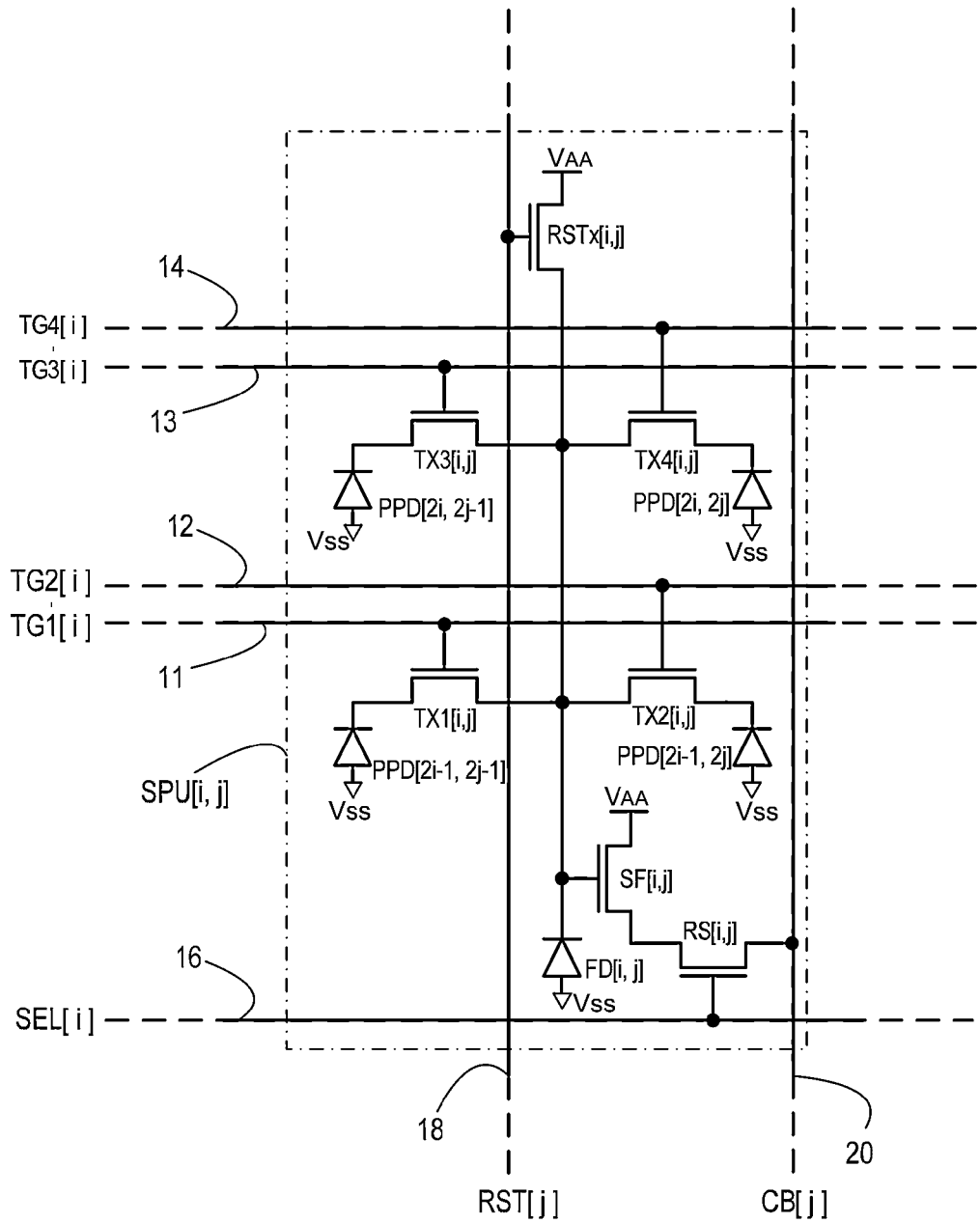
FIG. 1A depicts a portion of a pixel array comprising an illustrative binning pixel cell that may be implemented, in accordance with some embodiments.

Throughout the description and claims, the following terms take at least the meanings explicitly associated herein, unless the context dictates otherwise. The meanings identified below do not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

In addition, as used herein, unless the context clearly dictates otherwise, the term "coupled" refers to directly connected or to indirectly connected through one or more intermediate components and, in some contexts, may also denote or include electrically coupled, such as conductively coupled, capacitively coupled, and/or inductively coupled. Further, "conductively coupled" refers to being coupled via one or more intermediate components that permit energy transfer via conduction current, which is capable of including direct current as well as alternating current, while "capacitively coupled" refers to being electrostatically coupled through one or more dielectric media, and possibly also via one or more intervening conductors (e.g., via a series of capacitive components), that permit energy transfer via displacement current and not via direct current. Those skilled in the art will further understand that elements may be capacitively coupled intentionally or unintentionally (e.g., parasitically) and that in some contexts, elements said to be capacitively coupled may refer to intentional capacitive coupling. In addition, those skilled in the art will also understand that in some contexts the term "coupled" may refer to operative coupling, through direct and/or indirect connection. For instance, a conductor (e.g., control line) said to be coupled to the gate of a transistor may refer to the conductor being operable to control the gate potential so as to control the operation of the transistor (e.g., switching the transistor between "on" and "off" states), regardless of whether the conductor is connected to the gate indirectly (e.g., via another transistor, etc.) and/or directly.

As used herein, the terms "pixel" and "pixel circuit" in the context of an image-sensor pixel array refer to a picture element unit cell containing a photosensor and associated circuitry for converting photons incident on the photosensor into an electrical signal and coupling the electrical signal to circuitry external to the pixel array for discerning the photons detected by the photosensor. Also, for clarity and ease of reference, the terms "binning pixel cell" and "binning cell," as used herein, refer to a group of two or more pixels that are configured such that signals from the pixels can be binned (combined or summed) in the charge domain within the group of pixels. Also for clarity, in the context of a shared pixel array, the terms "shared-pixel circuit," and "shared-pixel unit" are used herein to refer to a unit cell containing a group of pixels that each have a photosensor and are configured to share at least some pixel circuitry that is not shared with other pixels. As such, it will be understood that a "shared-pixel circuit" or "shared-pixel unit" configured to provide for charge domain binning among the group of pixels therein may also be referred to as a binning pixel cell or binning cell, and may also be more specifically referred to as a "shared-pixel binning circuit" or a "shared-pixel binning unit," or the like. Also, simply for purposes of clarity and ease of reference in the ensuing description and claims, it is also understood that the terms "binning pixel cell," "binning cell," "shared-pixel binning cell," "shared pixel circuit," or similar terms, also embrace pixel configurations that may be considered non-shared pixel architectures (i.e., in which each pixel includes dedicated readout circuitry) when providing individual pixel readout but that are configured to selectively share at least a charge storage region to provide charge-domain binning. Additionally, it is noted that the terms "row" and "column" can be interchanged and do not imply a particular orientation of a pixel array, unless the context clearly dictates otherwise.

Briefly, as will be more fully understood in view of the ensuing disclosure in connection with the figures, some embodiments of the present invention provide an image sensor having a pixel array configured such that a plurality of pixels, electrically coupled to a common control line that when asserted causes the pixels to be readout concurrently, can each be readout concurrently in independently selectable readout modes, including at least one charge-domain binning mode. For instance, in various embodiments, the independently selectable readout modes may include at least two of the following modes: a non-binning mode, and one or more of the at least one charge-domain binning mode (e.g., 1×2, 2×1, 2×2, 1×4, same color binning, etc.). The common control line may, for example, be electrically coupled to control respective transfer switches in the plurality of pixels such that assertion of the common control line causes charge transfer from respective photosensors in the pixels to charge storage regions via the respective transfer switches. The common control line may, for example, be electrically coupled to control respective selection switches such that assertion of the common control line causes electrical signals to be output from the pixels via the selection switches. In some embodiments, the pixels that can be concurrently readout in different modes are in respective binning pixel cells, which may be shared binning pixel cells.

In some embodiments, an image sensor comprises a pixel array, wherein each pixel includes a respective photosensor coupled to a charge storage region (e.g., a floating diffusion) via a respective transfer switch (e.g., transistor) having a control terminal (e.g., gate) that is operable to selectively (i) activate (turn on; close) the switch so as to conductively couple the photosensor and the charge storage region, and (ii) deactivate (turn off; open) the switch so as to conductively decouple the photosensor and charge storage region. Each of a plurality of respective transfer control lines is coupled to the control terminals of the switches of a respective group of the pixels. For each transfer control line, assertion of the control line turns on the switches of the respective group of pixels such that charge may be transferred from the photosensors to the charge storage regions. For each of the pixels corresponding to a respective transfer control line, charge transferred from the photosensor to the charge storage region when the transfer control line is asserted can be selectively binned with charge generated by the photosensor of at least one other pixel in the pixel array, the selective binning being independently selectable for each of the pixels corresponding to the respective control line. The pixel array may be configured as an array of binning cells, wherein each binning cell may comprise two or more pixels, which may be neighboring pixels, that may share a common charge storage region. Pixels that share a common charge storage region may be coupled to respective ones of the transfer control lines. The photosensors or pixels that share a common charge storage region may be arranged, for example, as a row or column (e.g., 1×2, 2×1, 1×4, 4×1, etc.), or as an two-dimensional array (e.g., 2×2, 2×3, 4×2, etc.).

In some embodiments, for each of the pixels corresponding to a respective transfer control line, each of the charge storage regions to which the photosensors transfer charge may be selectively reset individually to a reset electrostatic potential. In other words, each of the charge storage regions corresponding to a common transfer control line may be selectively reset to a reset electrostatic potential according to timing that is not dependent on the timing according to which the charge storage regions of other pixels corresponding to the common transfer control line are selectively reset. As such, each of the charge storage regions corresponding to pixels that are coupled to a common transfer control line may be reset according to timing that may be different from or identical to the reset timing of one or more of the other charge storage regions corresponding to pixels that are coupled to the common transfer control line, as may be desired to effect selective charge-domain binning over the pixel array.

In some embodiments, for example, each of the charge storage regions of the pixels corresponding to a respective transfer control line may be coupled to a separate reset switching circuit that selectively conductively couples the charge storage region to a reset potential in response to a reset control signal being applied to the respective reset switching circuit via a respective reset control line, each of the charge storage regions corresponding to pixels of a common transfer control line thereby being individually resettable. For instance, each reset switching circuit may be implemented as a respective reset transistor having its gate connected to a respective reset control line, its drain connected to a reset voltage source, and its source connected to the charge transfer region. As indicated above, each charge storage region may be shared by a plurality of pixels, each of the pixels sharing a given charge storage region corresponds to a separate one of the transfer control lines that are each coupled to a respective group of the pixels.

In some embodiments, an image sensor may comprise a pixel array configured as a two-dimensional array comprising N columns and M rows of pixels (N×M array of pixels, typically a large number of pixels), organized as an n column by m row subarray of c pixel by r pixel binning pixel cells, where M, N, m, n, r, and c are positive integers, M>1, N>1, m=M/r and n=N/c, and at least one of r and c being greater than one. Each of the m×n binning pixel cells includes r×c pixels configured to share a charge storage region, each of the r×c pixels in each binning pixel cell having a respective photosensor and transfer gate configured to selectively transfer charge from the photosensor to the charge storage region of the binning pixel cell. For each of the m rows of binning pixel cells, the image sensor may include r×c transfer control lines, each being coupled to a respective one of the r×c transfer gates in each of the N/c (i.e., n) binning pixel cells in the row of binning pixels cells, each transfer control line being operable to control the N/c transfer gates coupled thereto for selectively transferring charge from the corresponding N/c photosensors to the respective N/c charge storage regions in the N/c pixels cells in the row. For each of the m rows of binning pixel cells, the N/c charge storage regions may be selectively reset individually (e.g., each of the N/c charge storage regions in each row may be reset separately, according to any desired respective timing that is not necessarily dependent on the reset timing of another of the N/c charge storage regions in the row of binning pixel cells).

For instance, in some embodiments, a respective reset circuit is coupled to each charge storage region in the pixel array, and for each of n columns of m binning pixel cells per column, each column comprising m charge storage regions corresponding to m rows of binning pixel cells, the m reset circuits in the column are all coupled to a respective one of n reset control lines, each of which is operable to cause, in response to a respective asserted reset control signal being applied thereto, the m reset circuits coupled thereto to conductively couple the m charge storage regions to a reset potential, without requiring application of an additional control signal to the reset circuits.

In some embodiments, each of the pixels cells may be configured such that each of the m×n charge storage regions may be selectively reset individually in response to assertion of a unique combination of control signals. For instance, a respective reset circuit may be coupled to each charge storage region in the pixel array, and for each of n columns of m binning pixel cells per column, each column comprising m charge storage regions corresponding to m rows of binning pixel cells, the m reset circuits in the column are all coupled to a respective one of n column reset control lines. In addition, for each of m rows of n binning pixel cells per row, each row comprising n charge storage regions corresponding to n columns of pixels cells, the n reset circuits in the row are all coupled to a respective one of m row reset control lines. Each reset circuit is therefore coupled to a unique combination of one of the m row reset control lines and the n column reset control lines, and is further configured such that signals must be asserted on both the row reset control line and the column control line coupled thereto in order for the reset control circuit to selectively conductively couple the corresponding charge storage region to a reset potential. As such, for each row of binning pixel cells, it is the respective column control lines coupled to each of the binning pixel cells in the row that provide for each of the charge storage regions in the row to be reset individually.

From the foregoing brief overview of some embodiments of the present invention, it may be appreciated that a feature provided by some embodiments is that binning pixels cells that are coupled to at least one common transfer control line can be reset according to different timing. Accordingly, for example, each of the binning pixel cells that are coupled to at least one common transfer control line can be selectively readout in any one of at least two modes, including at least one binning mode, based on the reset timing relative to the timing of signals provided to the at least one transfer control lines. In other words, a feature of some embodiments is that binning pixel cells that are coupled to at least one common transfer control line are not restricted to only being capable of being readout in the same mode (e.g., all in the same binning mode, or all in the same non-binning mode).

It will also be understood that in various embodiments, possible selective charge-domain binning modes may include binning charge from any combination of the pixels within the binning cell; possible selective non-binning modes may include individual readout of any combination of pixels in the binning pixel cell (e.g., individually reading out each pixel in the cell, individually reading out less than all but at least one of the pixels in the cell (e.g., sub-sampling the binning pixel cell) as well as readout of none of the pixels in the binning pixel cell.

It will be appreciated by those skilled in the art that the foregoing brief description and the following description with respect to the drawings are illustrative and explanatory of some embodiments of the present invention, and are neither representative nor inclusive of all subject matter and embodiments within the scope of the present invention, nor intended to be restrictive of the present invention or limiting of the advantages which can be achieved by embodiments of the present invention, nor intended to require that the present invention necessarily provide one or more of the advantages described herein with respect to some embodiments.

Referring now to the figures, FIG. 1A depicts a portion of a pixel array comprising an illustrative binning pixel cell that may be implemented in accordance with some embodiments. More specifically, the depicted binning pixel cell portion of a pixel array includes four pixels configured to share certain readout circuitry and to provide for charge-domain binning, and is thus also referred to as a shared-pixel binning unit SPU[i,j]. The pixel array may comprise a two-dimensional array of shared-pixel binning units identical to, and including, shared-pixel binning unit SPU[i,j], coupled by conductive lines 11, 12, 13, 14, 16, 18, and 20 extending over the array in both dimensions of the array.

Prior to further describing the embodiment of FIG. 1A, for clarity of exposition and ease of reference in describing the figures, the following describes the arbitrary convention used in the figures for specifying the bracketed indices in the reference characters to identify elements in the pixel array. In accordance with typical convention, for convenience, the term column is used to refer to the direction or orientation along which buses (conductive lines) used to couple pixel output signals to readout circuitry that is external to the pixel array (e.g., including pixel output sample-and-hold circuitry) extend, while the term row is used to refer to a direction or orientation that extends nonparallel to, and is typically generally perpendicular to, the column direction or orientation. For instance, by this convention, therefore, in FIG. 1A a column refers to the vertical direction or orientation (extending between the top and bottom of the figure) and a row refers to the horizontal direction or orientation (extending between the left and right sides of the figure).

And, as indicated in FIG. 1A, rows of shared-pixel units are indexed by an integer value "i" while columns of shared-pixel units are indexed by an integer value "j," wherein successive values of i correspond to successive rows of shared-pixel elements in the vertical direction and successive values of j correspond to successive columns of shared-pixel units in the horizontal direction. In other words, the subarray of shared pixel unit elements are indexed by row index i and column index j. Thus, for example, assuming the pixel array comprises n columns and m rows of shared-pixel units (i.e., an n×m shared pixel unit array), j=1, 2, 3 . . . n and i=1, 2, 3 . . . m. By arbitrary convention used herein, brackets of reference characters in the drawings conform to a [row, column] format; i.e., the first element identifies a row, the second element identifies a column. As such, for example, SPU[i,j], shown in FIG. 1A, refers to the shared-pixel unit in the ith row and jth column of an array of shared-pixel units. It is noted, however, that the bracketed notation does not necessarily denote that the indices specify the row and column of the shared-pixel unit; for instance, for some reference characters (e.g., identifying specific photodiodes, as further noted below) the specified indices within the brackets may be set forth to identify the referenced elements' position with respect to the rows and columns of pixels in the array.

Also for purposes of clarity of exposition and ease of reference, the ensuing description of the drawings may, in some circumstances, refer to components or signals in the drawings by the reference character shown in the drawings but omitting the bracketed portion (containing the index or indices) thereof. For instance, in referring collectively to the photodiodes PPD[2i−1,2j−1], PPD[2i−1,2j], PPD[2i,2j−1], PPD[2i,2j] in FIG. 1A, where the context is clear only the term "PPDs" may be employed. Similarly, in referring to each of the transfer transistors TX1[i,j], TX2[i,j], TX3[i,j], TX4[i,j], where it is clear that only shared-pixel unit SPU[i,j] is being discussed, only the terms TX1, TX2, TX3, TX4 may be employed.

Referring again to FIG. 1A, each pixel of SPU[i,j] has a respective photosensor (configured, in this embodiment, as a pinned photodiode) PPD[2i−1,2j−1], PPD[2i−1,2j], PPD[2i,2j−1], PPD[2i,2j] and a respective transfer transistor TX1[i,j], TX2[i,j], TX3[i,j], TX4[i,j] controlled respectively by transfer signals TG1[i], TG2[i], TG3[i], TG4[i] applied respectively to transfer control lines 11, 12, 13, 14 that are coupled to the gates of transfer transistors TX1[i,j], TX2[i,j], TX3[i,j], TX4[i,j], respectively. The pixels grouped as SPU[i,j] share a common readout circuit that includes a charge storage region configured as floating diffusion region FD[i,j], a source follower transistor SF[i,j], a row-select transistor RS[i,j] controlled by a row select signal SEL[i] applied to row select control line 16 that is coupled to row-select transistor RS[i,j], and a reset transistor RSTx[i,j] controlled by a reset signal RST[j] applied to reset control line 18 that is coupled to the gate of reset transistor RSTx[i,j].

Each photosensor PPD[2i−1,2j−1], PPD[2i−1,2j], PPD[2i,2j−1], PPD[2i,2j], shown as connected between a potential Vss (e.g., substrate potential, which may be at ground) and the respective transfer transistor TX1[i,j], TX2[i,j], TX3[i,j], TX4[i,j], are conductively coupled to the floating diffusion region FD[i,j] when the respective transfer transistors TX1[i,j], TX2[i,j], TX3[i,j], TX4[i,j] are activated by transfer control signals TG1[i], TG2[i], TG3[i], TG4[i]. Thus, photocarriers (e.g., electrons) generated by each photosensor PPD[2i−1,2j−1], PPD[2i−1,2j], PPD[2i,2j−1], PPD[2i,2j] may be selectively transferred to the floating diffusion region FD[i,j] in response to the transfer control signals TG1[i], TG2[i], TG3[i], TG4[i].

As noted above, in FIG. 1A the PPDs are indexed according to the pixel array indices expressed in terms of the i and j shared-pixel unit array indices. More specifically, because in this illustrative embodiment each shared pixel unit is configured as a 2×2 array of pixels, there are M=2m pixels in each column and N=2n pixels in each row (i.e., twice as many pixels as shared-pixel units in each column and in each row). Thus, the M×N array of pixels may be indexed by row index k=1, 2, 3 . . . M and column index l=1, 2, 3 . . . N; thus, the ith row of the shared-pixel unit array includes the k=2i−1 and k=2i rows of the pixel array; and, similarly, the jth column of the shared-pixel unit array includes the l=2j−1 and l=2j columns of the pixel array. Of course, using the pixel indices for the PPDs is arbitrary; for example, the individual pixels may instead be equivalently uniquely referenced using the shared-pixel array indices along with another distinguishing character (e.g., numeral), such as is shown for referencing the transfer transistors TX1[i,j], TX2[i,j], TX3[i,j], TX4[i,j].

It will be understood that while the schematic depiction of floating diffusion FD[i,j] being coupled to the drain regions of each transfer transistor TX1[i,j], TX2[i,j], TX3[i,j], TX4[i,j] is indicative of it being shared among the pixels, the floating diffusion FD[i,j] may be implemented in various ways. For instance, in some implementations, floating diffusion may be a single diffusion region formed in a semiconductor and disposed relative to each of the gates of transfer transistors TX1[i,j], TX2[i,j], TX3[i,j], TX4[i,j] so as to form the drain regions of each of the transfer transistors TX1[i,j], TX2[i,j], TX3[i,j], TX4[i,j]. In some alternative implementations, however, each of the transfer transistors TX1[i,j], TX2[i,j], TX3[i,j], TX4[i,j] may have respective drains formed as separate diffusion regions in the semiconductor, and each of these separate drain diffusion regions may be conductively coupled by one or more conductive lines formed on or above the semiconductor. As may be appreciated, the latter implementation may be well-suited to pixel arrays that provide binning pixel cells having non-neighboring pixels (e.g., for same color binning implementations).

As shown, floating diffusion region FD[i,j] is coupled to the drain of the reset transistor RSTx[i,j] and to the gate of source-follower transistor SF[i,j]. Reset transistor RSTx[i,j] is coupled to an array pixel supply voltage $V_{AA}$ such that when the reset transistors is activated in response to reset control signal RST[j], the floating diffusion region FD[i,j] is reset to a reset voltage corresponding to the array pixel supply voltage $V_{AA}$. The source follower transistor SF[i,j] is connected between the array pixel supply voltage $V_{AA}$ and the row select transistor RS[i,j], and converts the charge stored at the floating diffusion region FD[i,j] into an electrical output signal.

The row select transistor RS[i,j] is controllable via row select line 16 by row select signal SEL[i] for selectively outputting the electrical output signal of SPU[i,j] (which may be understood as including the shared-pixel binning unit's output reset voltage or the shared-pixel binning unit's output signal voltages; e.g., for implementing correlated double-sampling (CDS)) from the source follower transistor SF[i,j] onto column line (e.g., bus) 20, which is coupled to readout circuitry (not shown in FIG. 1A) that is disposed external to the pixel array and may include, for example, a current sink load transistor, and sample-and-hold circuitry for each column bus.

As understood by those skilled in the art, such sample-and-hold circuitry which may be provided for each column bus is typically configured for sampling the reset level as well as the signal level (e.g., in order to provide CDS). That is, in connection with readout of a shared pixel unit, two output signals may be generated, one being a reset signal generated after the floating diffusion region is reset, the other being an signal level representing an image or photo signal generated after charge is transferred from the photosensor(s) to the floating diffusion region in the shared pixel unit. The reset level and signal level output signals may be selectively stored in the sample-and-hold circuit based on respective reset select and signal select signals applied to the sample-and-hold circuitry. (For clarity, hereinbelow signal select sample-and-hold signals in some illustrative embodiments is referenced based on the nomenclature SIG_SH.)

Figure 1B:
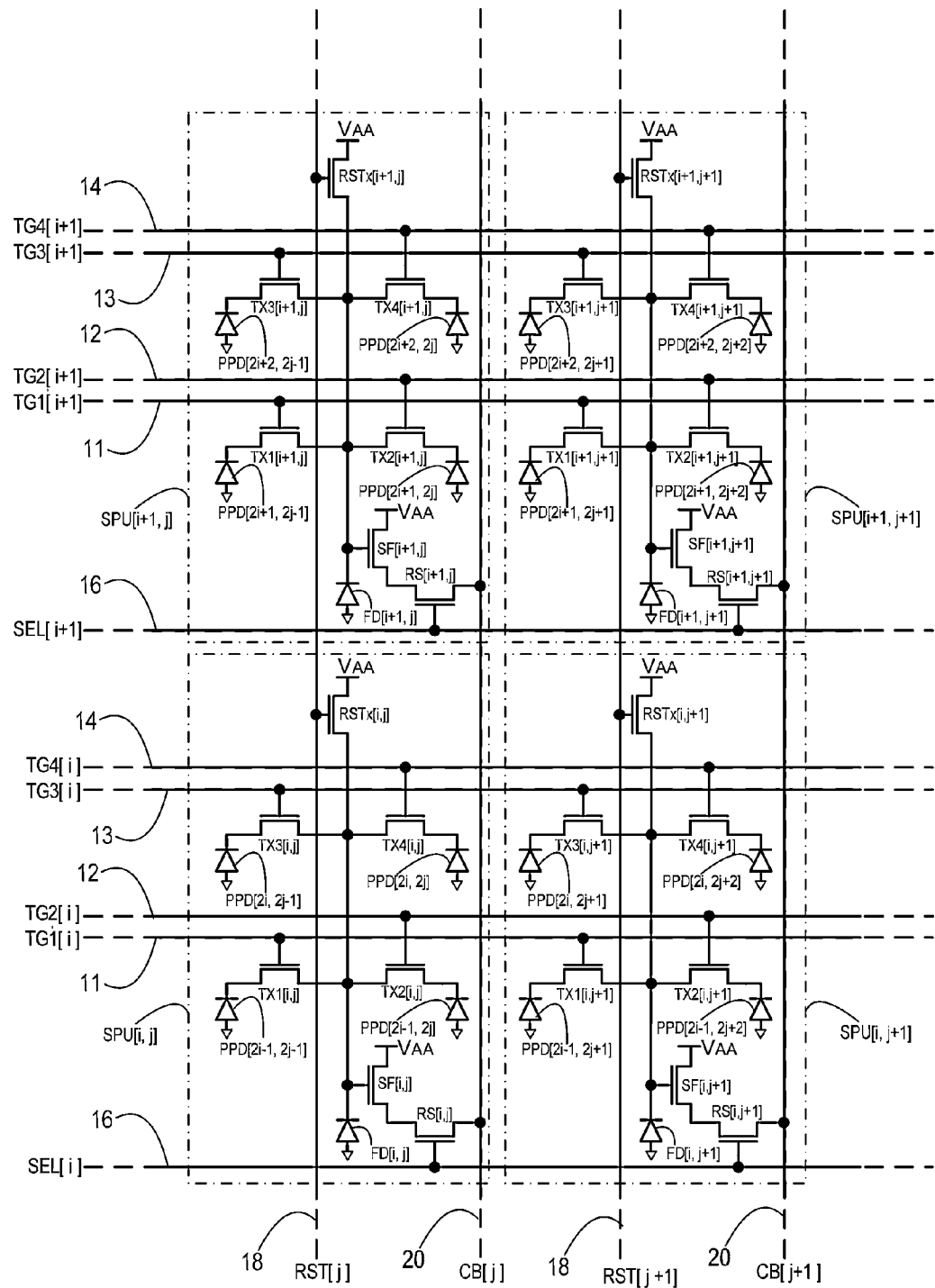
FIG. 1B depicts a portion of the pixel array comprising a 2×2 neighborhood of binning pixel cells including binning pixel cell shown in FIG. 1A, in accordance with some embodiments.

FIG. 1B provides additional clarity in describing the configuration and operation of the illustrative embodiment according to FIG. 1A of an image sensor comprising a pixel array implemented as an m row by and n column array of 2×2 shared-pixel units. More specifically, FIG. 1B depicts a portion of the pixel array comprising a 2×2 neighborhood of binning pixel cells including binning pixel cell SPU[i,j] shown in FIG. 1A, and thus depicts a 4×4 neighborhood of pixels, in accordance with this illustrative embodiment in which each SPU comprises a 2×2 array of neighboring pixels configured as in FIG. 1A.

As shown, in this illustrative embodiment, each of shared-pixel units SPU[i,j+1], SPU[i+1,j], and SPU[i+1,j+1] is configured as a 2×2 shared-pixel binning cell having the same pixel architecture described above for SPU[i,j]. Each shared-pixel unit SPU[i,j+1], SPU[i+1,j], and SPU[i+1,j+1] has a respective 2×2 array of PPDs (indexed according to their [row, column] with respect the pixel array) and associated transfer transistors TX1, TX2, TX3, TX4 (indexed according to their [row, column] with respect to the shared-pixel array), as well as the following elements, also indexed according to their [row, column] with respect to the shared-pixel array: floating diffusion FD, reset transistor RSTx, source follower transistor SF, and row select transistor RS.

As described in connection with FIG. 1A and more clearly seen in FIG. 1B, corresponding transfer transistors of shared pixel units in the same row are controlled by a common transfer signal applied to a common transfer control line that is coupled to the gates of the corresponding transfer transistors. For instance, in row i, transfer transistors TXn[i,j] and TXn[i,j+1] are both controlled by transfer signal TGn[i] applied to control line n+10, which is coupled to the respective gate of transfer transistors TXn[i,j] and TXn[i,j+1], where n=1, 2, 3, 4. In the same way, for row i+1, transfer transistors TXn[i+1,j] and TXn[i+1,j+1] are both controlled by transfer signal TGn[i+1] applied to control line n+10, which is coupled to the respective gate of transfer transistors TXn[i+1,j] and TXn[i+1,j+1], where n=1, 2, 3, 4. As such, for each row of shared pixel units, charge transfer from the photosensors to the floating diffusion in each shared pixel unit in the same row is effected in parallel according to the same timing as provided by transfer signals TG1, TG2, TG3, TG4.

In addition, shared pixel units in the same row are controlled by a common row select signal. For instance, as shown in FIG. 1B, in row i, row-select transistors RS[i,j] and RS[i,j+1] are both controlled by row select signal SEL[i] applied to row select control line 16 that is coupled to the respective gates of row-select transistor RS[i,j] and RS[i,j+1]; and in row i+1, row-select transistors RS[i+1,j] and RS[i+1,j+1] are similarly both controlled by row select signal SEL[i+1].

In accordance with some embodiments, such as the present illustrative embodiment, shared pixel units in the same row having one or more common transfer control lines coupled thereto are not controlled by a common reset signal that, upon assertion, necessarily causes the respective floating diffusions to be reset in parallel. Rather, the pixel array is configured such that shared pixel units in the same row may be reset according to different timing. For instance, with reference to FIG. 1B, it can be seen that reset transistors in the same row are controlled by different reset control signals applied to respective reset control lines. More specifically, in FIG. 1B, shared pixel units in the same column are controlled by a common reset select signal. For instance, as shown in FIG. 1B, in column j, reset transistors RSTx[i,j] and RST[i+1,j] are both controlled by reset control signal RST[j] applied to reset control line 18 that is coupled to the respective gates of reset transistors RSTx[i,j] and RSTx[i+1,j]; and, similarly, in column j+1, reset transistors RSTx[i,j+1] and RST[i+1,j+1] are both controlled by reset control signal RST[j+1] applied to reset control line 18 that is coupled to the respective gates of reset transistors RSTx[i,j+1] and RSTx[i+1,j+1].

Accordingly, it will be understood that because the transfer control lines 11, 12, 13, 14 extend row-wise (horizontally) to concurrently control transfer transistors of different shared pixel units in the same row, whereas the reset control lines 18 extend vertically, the reset control timing of the floating diffusion regions of shared pixel units in the same row, but different columns, can be different when controlling charge transfer from the pixels to the floating diffusion regions for all shared pixel units in the row concurrently according to the same transfer control signals TG1, TG2, TG3, TG4. Thus, for the same imaging frame, different shared pixel units in the same row can be readout in different modes. For instance, for a given frame, the pixels of one or more shared pixel units in a row may be readout in a charge-domain binning mode (e.g., where two or more of the pixel charge signals are binned within the shared pixel unit) while the pixels of one or more shared pixel units in the same row may be readout in a non-binning mode (e.g., each pixel is readout individually).

It will be also be understood that each row of shared pixel units can be readout using different timing for one or more of the reset control signals applied to the reset column control lines 18. In other words, shared pixel units in the same column can be readout according to different floating gate reset timing and, therefore, can be readout in different readout modes. In addition, those skilled in the art will understand that, alternatively or additionally, different rows of shared pixel units can be readout using different transfer gate control signal timing, which may also provide for different readout modes.

Figure 2A:
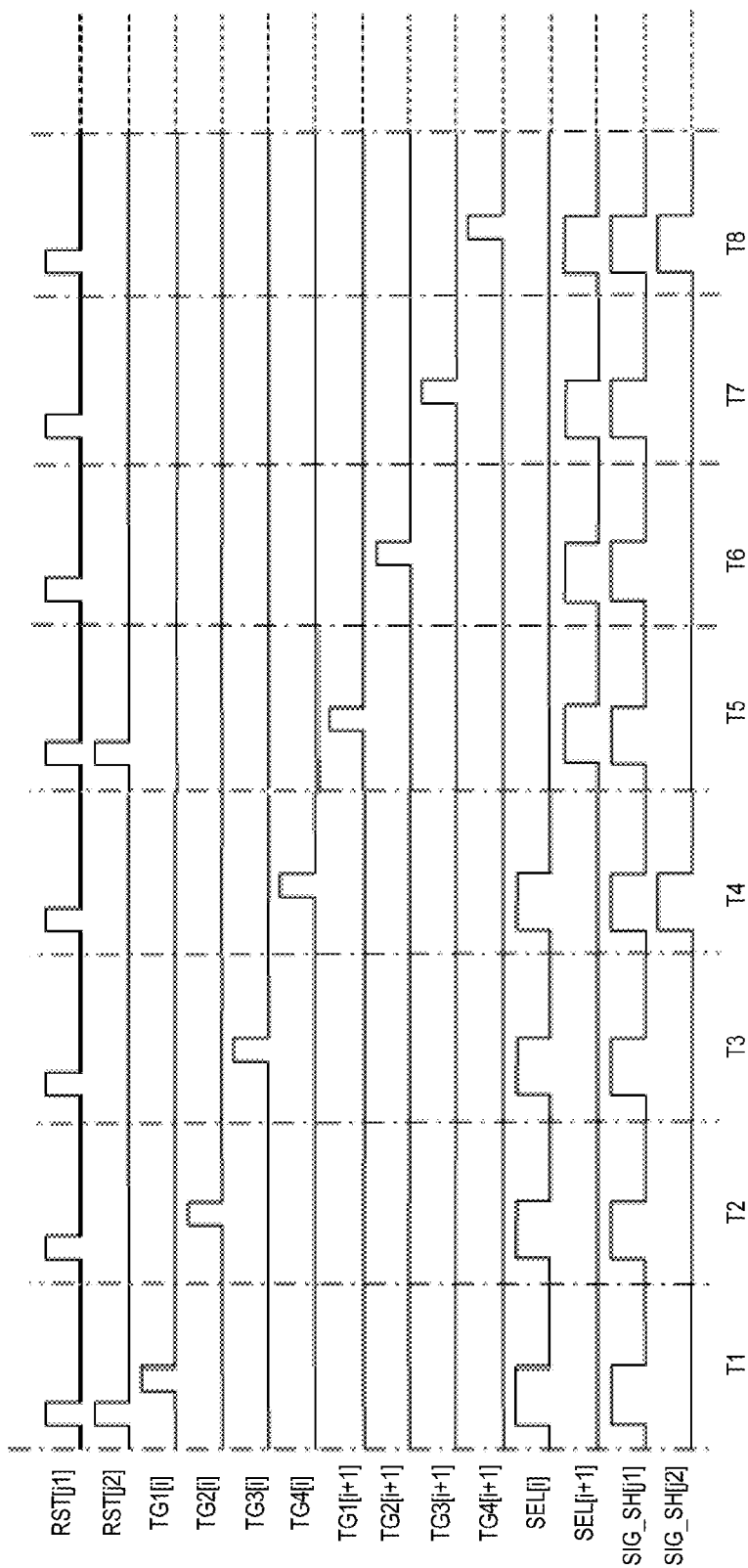
FIGS. 2A-2C each depict a different illustrative example of a readout timing diagram that may be implemented for the pixel array represented in FIGS. 1A and 1B, in accordance with some embodiments.

FIG. 2A shows an illustrative example of a readout timing diagram that may be implemented for the pixel array represented in FIGS. 1A and 1B for operating different SPUs in the same row, for two successive rows, in two different selective readout modes, one of the modes being a binning mode. It will be understood that in FIG. 2A (and in FIGS. 2B and 2C, discussed below) identical timing for two successive rows is shown only by way of non-limiting example for purposes of additional clarity; for instance, successive rows are not required to have identical timing or readout modes, and only a single row portion of the illustrative timing diagrams shown in FIGS. 2A-2C may be implemented on any of one or more rows as may be desired in some implementations.

In accordance with the non-limiting example of FIG. 2A, different SPUs in the same row that may be operated according to the two different selective readout modes may include (i) SPU[i,j] and SPU[i,j+1] in row i, and (ii) SPU[i+1,j] and SPU[i+1,j+1] in row i+1.

More specifically, in FIG. 2A, reset signal RST[j1] represents the reset signal applied to one or more SPUs in a given row via one or more separate, vertical reset control lines; for example, RST[j1] may represent the signal RST[j] applied to the reset transistor RST[i,j] in row i and to RST[i+1,j] in row i+1 in FIG. 1B. Similarly, reset signal RST[j2] represents the reset signal applied to one or more SPUs in the given row via one or more other separate, vertical reset control lines; for example, RST[j2] may represent the signal RST[j+1] applied to the reset transistor RST[i,j+1] in row i and to RST[i+1,j+1] in row i+1 in FIG. 1B. SIG_SH[j1] (SIG_SH[j2]) represents the signal select signal applied to sample-and-hold circuitry coupled to each column bus corresponding to the shared-pixel unit columns to which RST[j1] (RST[j2]) is applied. Thus, in the illustrative example, SIG_SH[j1] and SIG_SH[j2] are applied to the sample-and-hold circuits coupled to column buses CB[j] an CB[j+1], respectively. The remaining signals depicted in the timing diagram of FIG. 2A, namely, transfer gate control signals TGn[i] and TGn[i+1] (n=1, 2, 3, 4), SEL[i], and SEL[i+1] correspond to the identically referenced signals shown in FIGS. 1A and 1B.

Accordingly, it will be understood from the timing diagram of FIG. 2A that in row i, while SPU[i,j] and SPU[i,j+1] are concurrently driven with the same sequential, non-overlapping transfer gate control signals during time intervals T1 through T4, SPU[i,j] and SPU[i,j+1] are readout in different readout modes. More specifically, the pixels of SPU[i,j] are readout individually in a non-binning mode based on the floating diffusion region being reset prior to each successive transfer of charge from a respective photosensor to the floating diffusion region, whereas the pixels of SPU[i,j+1] are readout in a binning mode in which the charge of all pixels are binned (combined) on the floating diffusion region based on the floating diffusion region being reset only during T1 prior to any charge transfer from the photosensors to the floating diffusion region. As can be seen, in this example, similar timing is applied with respect to row i+1 during time intervals T5 through T8, thus causing SPU[i+1,j] and SPU[i+1,j+1] to be readout in corresponding non-binning and binning modes, respectively, for similar reasons. It will be further understood, by way of example, that if the timing diagram in FIG. 2A were modified such that within time periods T5 through T8, the signals RST[j1] and RST[j2], as well as the signals SIG_SH[j1] and SIG_SH[j2], were substituted for each other, then SPU[i+1,j] and SPU[i+1,j+1] would instead be readout in corresponding binning and non-binning modes, respectively. As such, the SPUs in rows i and i+1 but in the same one of columns j and j+1 would be readout in different modes.

As may be appreciated, in some implementations it may nonetheless be desirable, for each of one or more rows of shared-pixel units, to selectively readout all of the shared-pixel units that are in the same row according to the same readout mode (e.g., either all in the same binning mode, or all in the same non-binning mode).

Figure 2B:
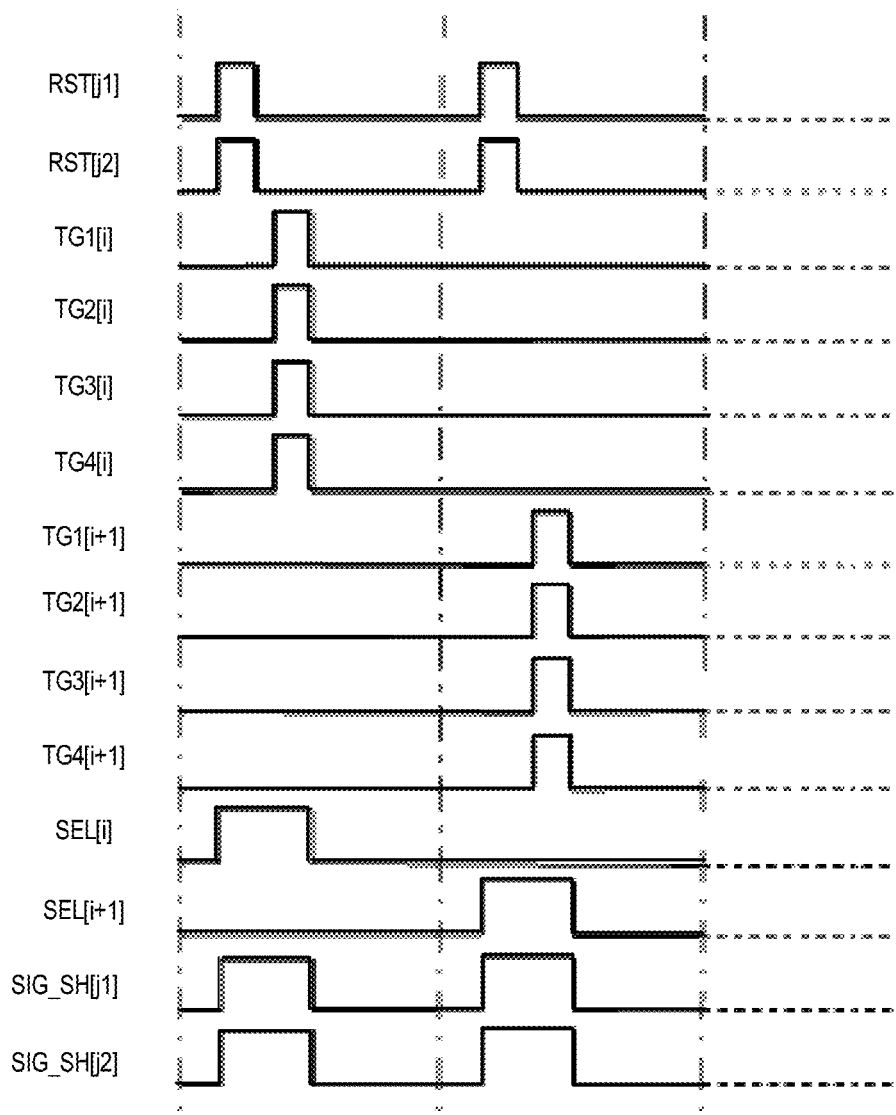

FIG. 2B shows an illustrative example of a readout timing diagram that may be implemented for the pixel array represented in FIGS. 1A and 1B for operating all of the SPUs in the same row, for two successive rows (by way of example only), in the same binning mode, namely, a binning mode in which all pixels within each SPU are binned. More specifically, the signals identified in FIG. 2B correspond to those discussed above in FIG. 2A and, in this example, during the readout times for rows i and i+1 the same reset control signal timing, represented by RST[j1] and RST[j2], is applied to every one of the n vertical reset control lines 18 in the illustrative m×n shared-pixel unit array. Similarly, the same sample-and-hold signal select timing (SIG_SH[j1] and SIG_SH[j2]) is applied to the sample-and-hold circuits coupled to each column bus of the array. While identical column-wise reset and sample-and-hold signal select signals are applied to all columns of the array, separate (but identical) RST[j1] and RST[j2] signals and separate (but identical) SIG_SH[j1] and SIG_SH[j2] signals are depicted simply for purposes of clarity by being consistent with the description FIG. 2A in which the j1 and j2 column-wise signals are said to be applied to the SPUs of column j and j+1, respectively.

As will be understood from FIG. 2B, based on identical signals being applied to every SPU in the same row as well as the transfer gate control signals being concurrently applied following application of the reset signal, each of the SPUs in each of rows i and i+1 are readout in a binning mode in which the charge of all pixels in the SPU are binned. For clarity, it is noted that in this example all of the transfer signals are capable of being applied concurrently because all SPUs in the same row are intended to be binned such that all pixels within each SPU being binned together. Concurrent activation of all of the transfer gates in activation, however, is not required in order to bin all of the pixels in each SPU (2×2 binning, in this example), as may also be understood in view of the above description of FIG. 2A in which 2×2 binning may be provided in a given SPU in accordance with successively transferring photosensor charge to the floating diffusion.

Figure 2C:
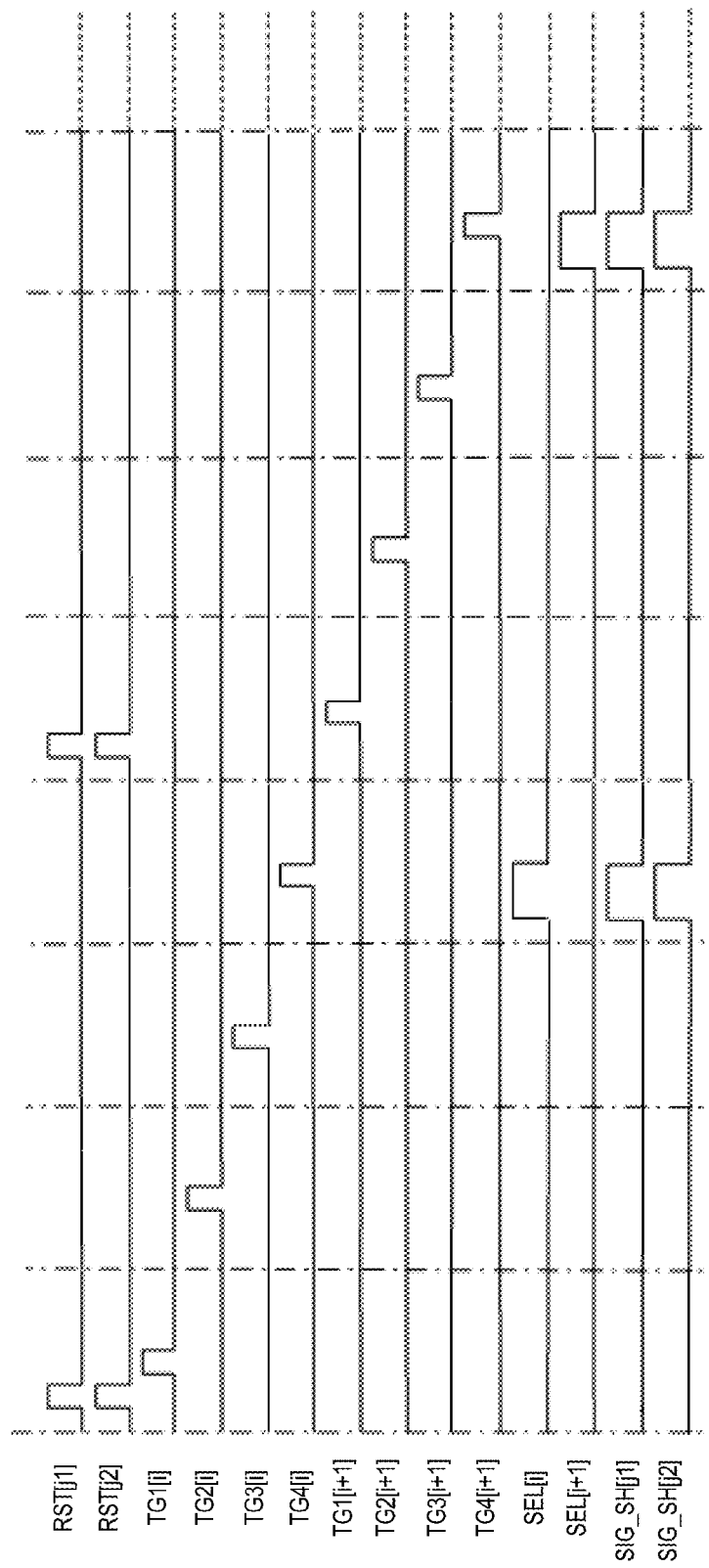

More specifically, FIG. 2C depicts an illustrative timing diagram that provides for all SPUs in a row to be readout in a 2×2 binning mode, while employing successively, and not concurrently, applied transfer gate signals having timing that is symmetric with the timing that may be employed for non-binning readout of each individual pixel in an SPU. It is understood, however, that compared to the concurrent transfer gate timing control of FIG. 2B, this successive transfer gate timing control will generally increase row time and reduce high frame rate capabilities, which may be a consideration in some implementations.

Referring now to FIG. 3, a non-limiting example of an illustrative implementation of some embodiments is provided to illustrate some illustrative non-limiting advantages that may be provided by some embodiments. More specifically, FIG. 3 schematically depicts a pixel array 30 comprising an array of shared-pixel binning units similar to those described with reference to FIGS. 1A and 1B. In this example, the pixels within the Field-Of-Interest (FOI) region are required, or otherwise desired, to be readout in a high resolution mode, such as by reading out the pixels individually (i.e., without any charge-domain binning). Outside the FOI, however, charge-mode pixel binning is desired or needed to reduce the output bandwidth without requiring an off-chip pixel binning process, and/or to reduce the bandwidth required to read the pixel signals out of the pixel array into the readout circuitry external to the pixel array.

As indicated, the FOI may be specified, for example, in accordance with row coordinates R1, R2 and column coordinates C1, C2 (shown in [row, column] format) that may be stored by or provided to a controller, host processor, and/or other device, and that may be variable or fixed, depending on the implementation. For example, depending on the implementation, the FOI may be specified in one or more ways, such as upon manufacture of an associated host processor, and/or automatically by (e.g., by programmatic control) or manually through (e.g., user input) a system (e.g., surveillance system, camera or other host processor or device, etc.) that comprises an image sensor implementing an embodiment in accordance with the present disclosure.

As schematically depicted in FIG. 3, the pixels outside the FOI may be categorized into two regions, Region_A and Region_B. In Region_A, every row has a row address that is not within the range of addresses bound by row R1 and row R2; that is, the rows in Region_A do not include any pixels within the FOI. In Region_B, however, the row addresses are within the range of addresses bound by row R1 and row R2; thus, rows that extend into region B (which is outside the FOI) include pixels that are within the FOI, namely, pixels having column addresses between column C1 and C2.

It may be appreciated that without the capability of reading out different shared-pixel units in the same row according to different modes, including a binning mode, as provided by some embodiments of the present invention, to obtain full resolution readout within the FOI would necessarily require reading out the pixels in Region_B, outside the FOI, in full resolution mode.

In accordance with some embodiments of the present disclosure, however, because the pixel reset signal (for causing reset of the pixel floating diffusion region) is gated in the column direction, the reset operation of different columns can have different timing, thus enabling in-pixel charge-domain binning (e.g., 2×2 pixel binning) to be implemented in all pixels outside the FOI, namely, both in Region_A and Region_B, while reading out pixels in the FOI in full resolution mode. For instance, for row addresses in Region_A (i.e., outside the range delimited by R1 and R2), timing control in accordance with that described for FIG. 2B (or FIG. 2C) may be applied. And for row addresses in Region_B (i.e., within the range delimited by R1 and R2), timing control in accordance with that described for FIG. 2A may be applied, with the column-wise j2 signals (i.e., RST[j2] and SIG_SH[j2]) applied to columns outside the range delimited by C1 and C2, and with the column-wise j1 signals (i.e., RST[j1] and SIG_SH[j1]) applied to columns within the range delimited by C1 and C2.

As will be understood in view of the foregoing illustrative timing diagrams of FIGS. 2A-C and illustrative implementation example of FIG. 3, while the timing control of the transfer gates is common among all the shared pixels units for the row being readout, different shared pixel units in the row being readout may implement different binning modes by implementing different reset timing relative to the common transfer gate control timing. Further, it may be understood that the examples shown in FIGS. 2A-2C are merely illustrative of possible different readout modes that can be implemented in the same row. For instance, it will be understood that the timing control sequences applied to the transfer gate control signals and/or the reset timing signals applied to different reset transistors of different rows may be varied to provide different and additional binning and/or non-binning readout modes, and that various embodiments may provide for different readout from the same row for a given frame in the same row readout operation to be readout in more than two different readout modes (e.g., three or more binning modes, a non-binning mode and two or more binning modes, etc.).

For instance, with respect to the transfer gate timing control shown in FIG. 2A, the reset timing control applied to at least one other shared pixel element in the row may reset the corresponding floating diffusion region prior to the successive assertion of TG1 and TG2 and prior to the successive assertion of TG3 and TG4, thus separately pair-wise binning (i) the pixels corresponding to TX1 and TX2 and (ii) the pixels corresponding to TX3 and TX4, the signals of which may be sampled by providing a corresponding signal sample-and-hold signal (e.g., SIG_SH[j3]) asserted (e.g., pulsed) at appropriate times within time periods T2 and T4.

By way of further example, also with respect to the transfer gate timing control shown in FIG. 2A, the reset timing applied to another shared pixel element in the row may reset the floating diffusion region prior to assertion of TG1, and then prior to assertion of TG2, but not after assertion of TG2. Accordingly, the pixel corresponding to TX1 may be readout individually while the pixels corresponding to TX2, TX3, and TX4 may be binned. Particularly, these respective signals may be sampled by providing a corresponding signal sample-and-hold signal (e.g., SIG_SH[j4]) asserted (e.g., pulsed) at appropriate times within time periods T1 and T4.

In addition, as noted, further possible readout modes may be provided by altering the transfer gate timing control. For instance, the transfer gate pulsing order may be altered (e.g., such as in the order of TG1, TG4, TG2, TG3 instead of TG1, TG2, TG3, TG4) and/or one or more transfer gate pulses may be omitted, so that different subcombinations of pixels may be binned and/or subsampled in some of the shared-pixel units.

Figure 4:
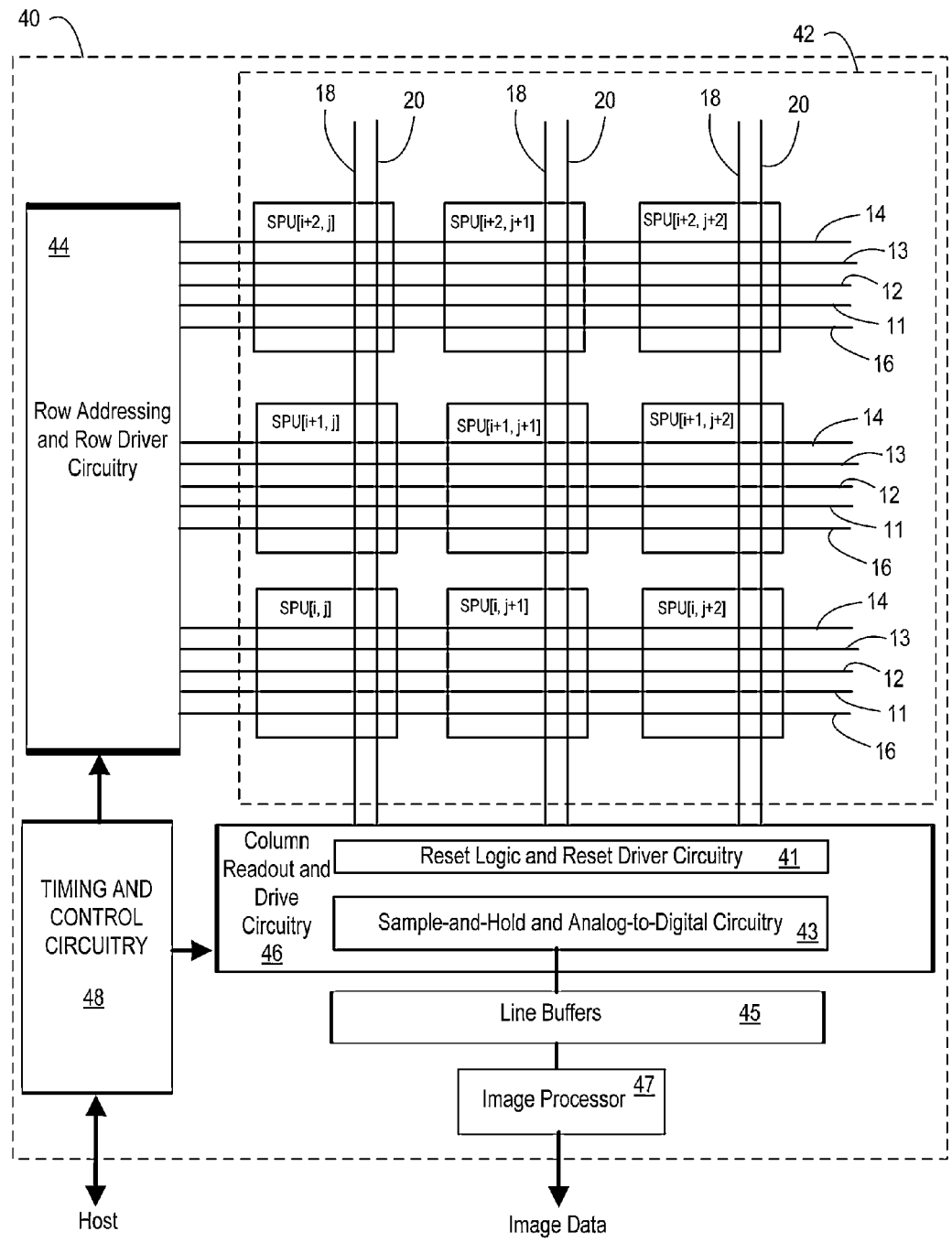
FIG. 4 depicts a block diagram of an illustrative CMOS image sensor architecture that may be used to implement column-wise selective binning, in accordance with some embodiments.

FIG. 4 depicts a block diagram of an illustrative CMOS image sensor 40 architecture that may be used to implement column-wise selective binning such as described hereinabove in connection with FIGS. 1A through 4, in accordance with some embodiments. CMOS image sensor 40 is shown as including a simplified pixel array 42 comprising a three by three array of shared-pixel units corresponding to, and configured in accordance with, the shared pixel unit array of FIG. 1A and FIG. 1B but further depicting a third row and a third column of SPUs, containing SPU[i+2,j], SPU[i+2,j+1], SPU[i+2,j+2], SPU[i,j+2], and SPU[i+1,j+2].

Row Addressing and Row Driver Circuitry 44 generates transfer gate control signals on lines 11-14 and row select signals on lines 16. Column readout and drive circuitry includes reset logic and reset drive circuitry, which is operable to generate column-wise selectable reset signals applied to column buses 18. Column Readout and Drive Circuitry 46 also includes sample-and-hold and analog-to-digital circuitry 43 for sampling and digitizing output values readout from the pixel array 42. Sample-and-hold and analog-to-digital circuitry 43 may implement column-parallel readout, being configured such that the readout circuitry associated with each column bus 20 may have a respective sample-and-hold circuit and an associated analog-to-digital converter (ADC), though in some embodiments pairs of columns may share an ADC. Sample-and-hold circuitry may also be configured to provide correlated double-sampling.

Timing and control circuitry 48 controls both the row addressing and row driver circuitry 44 and the column readout and drive circuitry 43 to provide for column-wise selective binning while reading out the pixel array on a row-by-row basis. For instance, timing and control circuitry controls the row addressing and row driver circuitry 44 for selecting the appropriate row for readout. In various additional or alternative embodiments, timing and control circuitry may also control row circuitry 44 such that the transfer gate and select signal timing may be selectively controlled on a row-wise basis. Timing and control circuitry 48 also controls the reset logic and drive circuitry 41 as well as the sample-and-hold circuitry 43 to provide for, on an SPU row-by-row basis, (i) appropriate reset control signals to be applied to each of the vertical reset lines 18 of the array, and (ii) appropriate corresponding sample-and-hold select signals to be applied to sample-and-hold circuitry. For instance, in some implementations, based on the row address, timing and control circuitry may activate a column-wise logic mask to selectively adjust the sampling frequency for columns depending on what readout mode (e.g., what timing control pattern) is being applied to each SPU in the row being addressed.

As indicated in FIG. 4, timing and control circuitry 48 may communicably interface with a host (e.g., a processor associated with a system comprising the image sensor), which may, for example, in some implementations, specify various control information, such as data indicative of which readout mode(s) should be applied to which shared pixel units in the array (e.g., in one simple example, data representing R1, C1, R2, C2, as per the above description of FIG. 3).

In some embodiments, timing and control circuitry 48 may also be configured to provide power control to reduce power consumption by controlling power according to a column-wise basis. For example, as may be appreciated in view of, for example, FIG. 2A, FIG. 2B, and FIG. 3, while reading out a row that includes 2×2 binning SPU readout (e.g., Region_B in FIG. 3, timing in FIG. 2B) and non-binning SPU readout (e.g., Region_A in FIG. 3, timing in periods T1-T4 of FIG. 2A), the columns in Region_B are operating only about 25% of the time required to readout the row (e.g., only during T1, compared to operating for the period T1-T4 for non-binning readout). Accordingly, control circuitry 48 may also be configured to selectively power up/down column power enable signals on a column-wise basis according to the column readout mode, depending on whether different SPUs in the addressed row require different time periods for readout (e.g., when reading out rows in Region-B in FIG. 3, powering down columns outside of the FOI during time periods T2-T4 of FIG. 2A), thus reducing power consumption by providing shorter duty cycle for power enable signals controlling columns that are operable during less than the full row readout period required to readout all pixels in the row.

In operation, SPU signals of shared-pixel array 42 are readout onto column buses 18 on an SPU-row by SPU-row basis with column-wise selectable binning, in accordance with the row-wise timing control signals applied to the SPUs on lines 11-14, the column-wise reset signals applied to the SPUs on lines 18, and readout signals (e.g., sample select signals) in column readout circuitry (e.g., sample-and-hold circuitry 43) coupled to column buses 18.

The signals on column buses 18 are sampled and digitized by circuitry 43, and the digitized pixel values provided by the ADC may be provided to line buffers 45, which may be used to temporarily store digital signals from circuitry 43 for use by image processor 47. In general, any number of line buffers 45 may be included and, for example, each line buffer may be capable of storing digital signals representative of the charge signals that may be read from each pixel in a given row of pixels in the pixel array 42. Image processor 47 may be used to process the digital signals held in line buffers 36 to produce output image data that may be provided to a device external to the image sensor 40.

As may be appreciated, there are many possible alternative implementations of an image sensor architecture for implementing selective charge-domain binning in accordance with the present disclosure. By way of example, it will be understood that circuitry 46 may be divided into two portions provided at the top and bottom of the pixels array. Alternatively, for example, readout circuitry coupled to the column buses 18 may be provided at the bottom of the pixel array (e.g., as shown) while the reset logic and drive circuitry 41 may be provided at the top of the array.

Figure 5A:
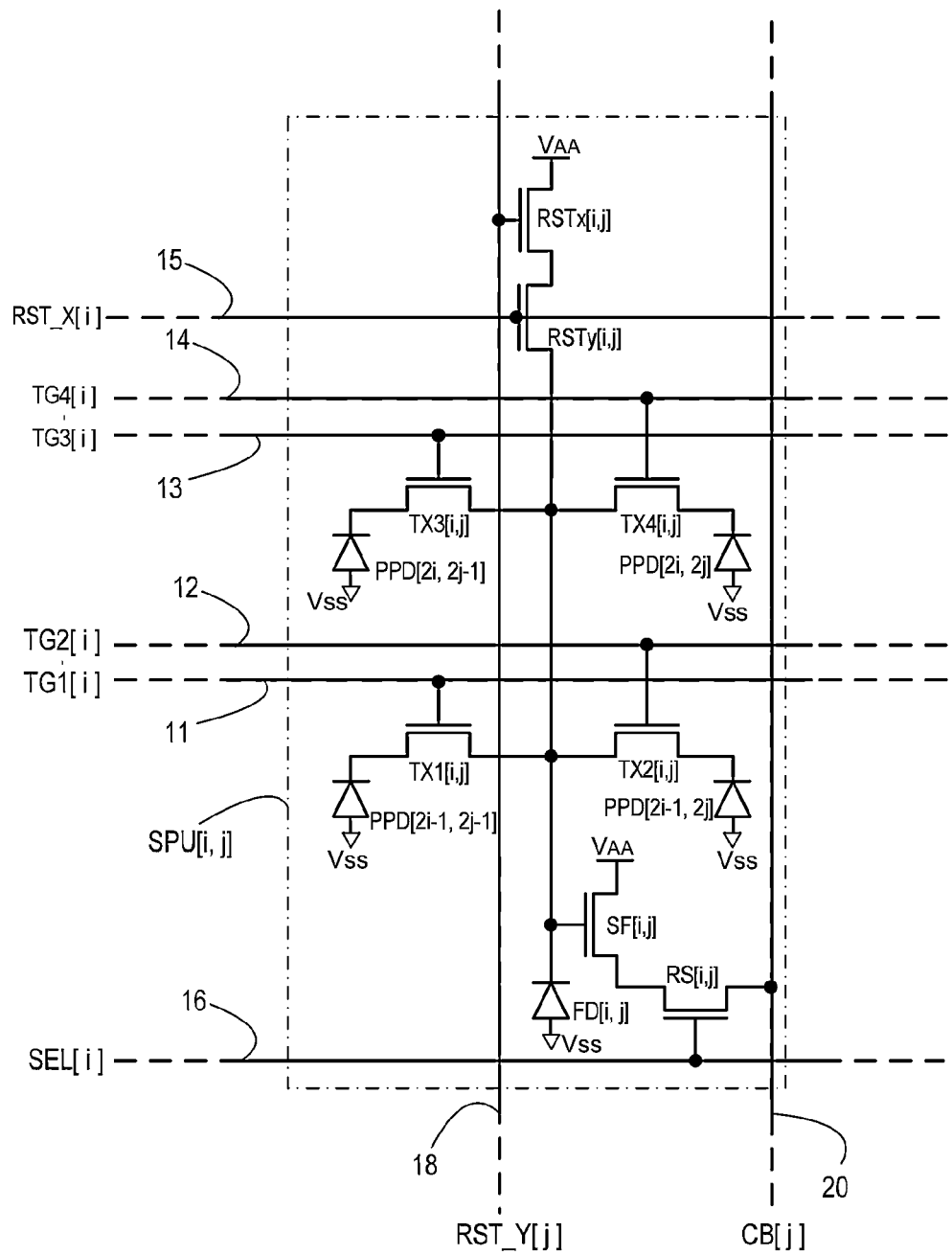
FIGS. 5A and 5B schematically depict two variations of illustrative shared pixel circuits that each additionally employ a row-wise reset control signal, in accordance with some embodiments.
Figure 5B:
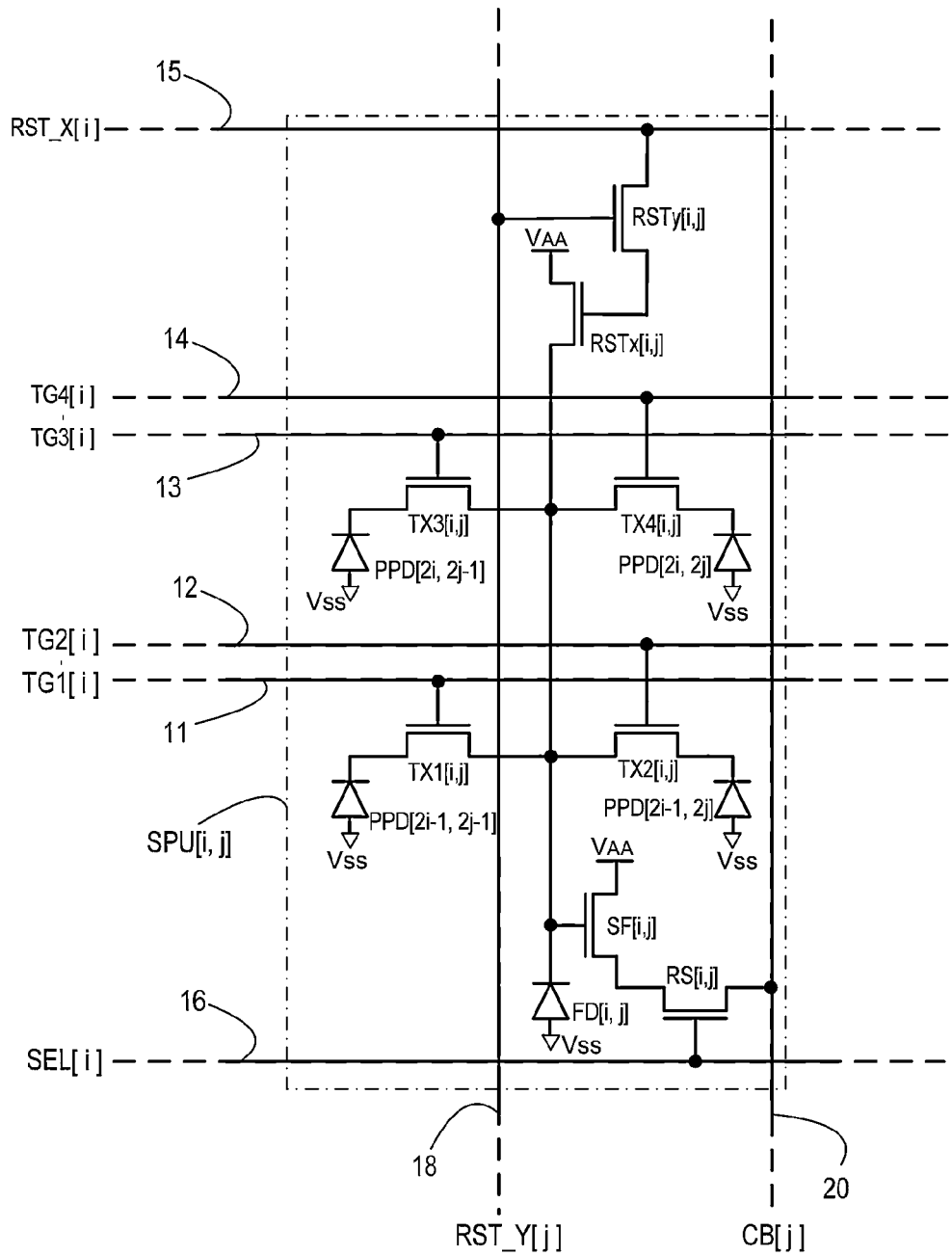

In addition, it will be understood that the SPU circuit architecture may be varied in many ways. By way of example, FIGS. 5A and 5B illustrate two variations of the shared pixel circuit of FIG. 1A. As shown, the pixel circuits in FIGS. 5A and 5B are essentially identical to the circuit of FIG. 1A, except for adding a transistor RSTy to the in-pixel reset circuitry as well as an additional horizontal control line 15 to which is selectively applied a row-wise reset signal RST_X[i]. It will be understood, therefore, that according to the configurations of FIG. 5A and FIG. 5B, resetting a floating diffusion region FD[i,j] requires appropriately timed activation of both RST_X[i] and RST_Y[j], thus, enabling specific row selection of the columns intended for specialized reset operation, which reduces switching current compared to the SPU configuration of FIG. 1A, in which the floating diffusions of all SPUs in a column are reset when the vertical reset signal of that column is activated in order to reset the SPU in an addressed row being readout. It will be understood, however, that the resetting operation in the SPU configurations of FIGS. 5A and 5B is nonetheless selectively gated on an individual column-wise basis based on the vertical reset select signal. In other words, it is evidently the vertical reset signals RST_Y[j] (as configured relative to the rowwise transfer gate control lines/signals), not the horizontal reset signals RST_X[i], that provide for columnwise selective binning during rowwise readout of the pixel array.

The SPU circuit architecture may be further varied in many other ways. For instance, while the foregoing illustrative embodiments are based on a 4T-type of pixel configuration, but configured in a 2×2 shared pixel arrangement to provide essentially 1.75 transistors/pixel, other basic pixel configurations (e.g., 5T, etc.) may be used, as well as different shared pixel configurations (e.g., 2×1, 1×2, 1×4, 4×1). For instance, it should be understood that other embodiments may include readout circuitry shared by other number of pixels. In some embodiments, each pixel configured to share a common readout circuit may receive incident light filtered for different colors or the same color, or a plurality of pixels sharing readout circuitry may receive incident light filtered for a first color, while another plurality of pixels sharing the same readout circuitry may receive incident light filtered for a second color.

Charge-domain binning may additionally or alternatively be implemented between or among non-neighboring pixels, for instance, possibly to selectively bin corresponding colors over a color filter array kernel (e.g., a Bayer filter pattern). More specifically, simply by way of example, for color imaging, a Bayer color filter pattern is typically disposed over the pixel array. The effect of the Bayer filter is that pixels in odd rows/columns, or pixels in even rows/columns represent the same color. In some embodiments, therefore, a charge binning mode may combine pixels of the same color.

In addition, some alternative embodiments may employ pixel configurations based on an in-pixel capacitive transimpedance amplifier (CTIA) rather than a source-follower based design. Such CTIA designs may be advantageous for implementing color-wise binning, so as to avoid conversion gain degradation. Further, some embodiments may employ selective connection of respective pixels' floating diffusion regions, such as for adjusting conversion gain based on the readout mode (e.g., binning vs. non-binning).

As may be appreciated, in accordance with some embodiments of the present disclosure, modes of operation can vary from binning to subsampling over multiple window sizes, which may be used to achieve intra-scene high dynamic range by adjusting exposure to the maximum time needed for full-well in full resolution pixel regions, while defining multiple regions of different subsampling and binning ratios elsewhere.

The present invention has been illustrated and described with respect to some specific embodiments thereof, which embodiments are merely illustrative of some of the principles of some embodiments of the invention and are not intended to be exclusive or otherwise limiting embodiments. Accordingly, although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, except to the extent necessary or inherent in the processes themselves, no particular order to steps or stages of methods or processes described in this disclosure, including the figures, is implied. In many cases the order of process steps may be varied, and various illustrative steps may be combined, altered, or omitted, without changing the purpose, effect or import of the methods described. Similarly, the structure and/or function of a component may be combined into a single component or divided among two or more components. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with the claims that follow.

What is claimed is:

1. An image sensor, comprising:
    a plurality of binning pixel cells, each binning pixel cell comprising a plurality of photosensors, each photosensor being operable to convert photons incident thereon into a charge signal;
    a plurality of first control lines that are each coupled to each of a first set of the plurality of binning pixel cells, the first set including at least a plurality of the binning pixel cells;
    a plurality of second control lines that are each coupled to each of a second set of the plurality of binning pixel cells, the second set including at least a plurality of the binning pixel cells that are different from the binning pixel cells in the first set;
    a plurality of third control lines, each being coupled to a respective one of the binning pixel cells in said first set of binning pixel cells; and
    a circuit configured to drive each of said plurality of third control lines with a respective control signal that is individually selectable from at least a first control signal and a second control signal that has at least one signal characteristic different from the first control signal, such that the first control signal and the second control signal are each capable of being selectively applied individually to each of said plurality of third control lines during readout of a given image frame, wherein for each of the first set of binning pixel cells, (i) the respective charge signals generated by at least two of the photosensors in the binning pixel cell are combined in the binning pixel cell in the event that the first control signal is applied to the respective third control line that is coupled to the binning pixel cell, and (ii) none of the respective charge signals generated by each of the photosensors in the binning pixel cell are combined in the binning pixel cell in the event that the second control signal is applied to the respective third control line that is coupled to the binning pixel cell, such that during readout of a given image frame different binning pixel cells in the first set of binning pixel cells are capable being readout with and without binning, respectively.

2. The image sensor according to claim 1, wherein each binning pixel cell comprises a shared pixel unit that includes (i) a charge storage region; (ii) a respective transfer switch for each of the photosensors in the binning pixel cell, each transfer switch being configured to selectively transfer the charge generated by the corresponding respective photosensor to the charge storage region in response to a transfer signal provided to the respective transfer switch via a respective one of the plurality of first control lines, and (iii) a reset circuit configured to selectively reset the charge storage node based on the respective control signal coupled to the reset circuit via the respective third control line coupled to the binning pixel cell.

3. The image sensor according to claim 1, wherein the binning pixel cells are configured as a two dimensional array comprising m rows and n columns of the binning pixel cells, wherein one of the rows comprises said first set of binning pixel cells, another of the rows comprises said second set of binning pixel cells, and wherein each of the third control lines is coupled to each of the m binning pixel cells in a respective one of the n columns of binning pixel cells, wherein m and n are each greater than two.

4. The image sensor according to claim 3, wherein each binning pixel cell is configured as a shared pixel unit comprising four of the photosensors arranged in a 2 by 2 array in the row and column directions.

5. The image sensor according to claim 3, further comprising a control circuit that is configured to selectively power down circuitry independently associated with respective columns of the binning pixel cells.

6. A method for operating an image sensor that comprises an array of binning pixel cells, each binning pixel cell including (i) a plurality of photosensors that generate respective charge signals in response to incident light, and (ii) a charge storage region, the method comprising:

for a given image frame acquired by the image sensor, applying a first common signal to a first plurality of the binning pixel cells to cause, concurrently in each of the first plurality of binning pixel cells, transfer of charge from a first photosensor to the charge storage region;

for the given image frame acquired by the image sensor, applying a second common signal to the first plurality of the binning pixel cells to cause, concurrently in each of the first plurality of binning pixel cells, transfer of charge from a second photosensor to the charge storage region; and for the given image frame acquired by the image sensor, applying a first reset signal for resetting the charge storage region of a first one of the first plurality of binning pixel cells without resetting the charge storage region between the charge transfers from the first and second photosensors to the charge transfer region of the first one of the binning pixel cells, the first reset signal providing for reading out from the charge transfer region of the first one of the binning pixel cells a first stored charge signal that is a sum of at least the charge transferred from the first and second photosensors; and for the given image frame acquired by the image sensor, applying a second reset signal for resetting the charge storage region of a second one of the first plurality of binning pixel cells, the second reset signal causing resetting of the charge storage region between the charge transfers from the first and second photosensors to the charge transfer region of the second one of the binning pixel cells, the second reset signal providing for separately reading out from the charge transfer region of the second one of the binning pixel cells (i) a second stored charge signal corresponding to the charge transferred from the first photosensor, and (ii) a third stored charge signal corresponding to the charge transferred from the second photosensor.

7. The method according to claim 6, wherein each binning pixel cell includes a plurality of respective transfer gates configured to selectively transfer charge between each of the plurality of photosensors and the charge storage region, wherein the first common signal is applied to each of the transfer gates configured to transfer charge from the first photosensor to the charge storage region in each of the first plurality of the binning pixel cells, and wherein the second common signal is applied to each of the transfer gates configured to transfer charge from the second photosensor to the charge storage region in each of the first plurality of the binning pixel cells.

* * * * *